United States Patent
Huang et al.

(10) Patent No.: US 10,176,956 B2
(45) Date of Patent: Jan. 8, 2019

(54) SAFETY TRIPPING DEVICE FOR A FRAME-TYPE ACB DRAWER SEAT

(71) Applicant: Guizhou Taiyong Changzheng Technology Co., Ltd., Zunyi (CN)

(72) Inventors: Zhengqian Huang, Zunyi (CN); Kerang Feng, Zunyi (CN); Yu'e Zeng, Zunyi (CN)

(73) Assignee: Guizhou Taiyong Changzheng Technology Co., Ltd., Zunyi (CN)

( * ) Notice: Subject to any disclaimer, the term of this patent is extended or adjusted under 35 U.S.C. 154(b) by 0 days.

(21) Appl. No.: 15/700,185

(22) Filed: Sep. 11, 2017

(65) Prior Publication Data

US 2018/0144898 A1  May 24, 2018

(30) Foreign Application Priority Data

Nov. 24, 2016  (CN) .......................... 2016 1 1044286

(51) Int. Cl.
| | | |
|---|---|---|
| H01H 71/52 | (2006.01) | |
| H02H 3/353 | (2006.01) | |
| H01H 71/12 | (2006.01) | |
| H01H 71/24 | (2006.01) | |

(52) U.S. Cl.
CPC ........ *H01H 71/525* (2013.01); *H01H 71/128* (2013.01); *H01H 71/521* (2013.01); *H02H 3/353* (2013.01); *H01H 2071/249* (2013.01)

(58) Field of Classification Search
CPC .. H01H 71/525; H01H 71/521; H01H 71/128; H01H 2071/249; H02H 3/353
USPC .......................................................... 200/322
See application file for complete search history.

(56) References Cited

U.S. PATENT DOCUMENTS 4,839,476 A * 6/1989 Okuno ................. H01H 3/3042
200/17 R

* cited by examiner

*Primary Examiner* — Edwin A. Leon
*Assistant Examiner* — Lheiren Mae A Caroc
(74) *Attorney, Agent, or Firm* — Gokalp Bayramoglu

(57) ABSTRACT

A safety tripping device for a frame-type ACB drawer seat, which includes a special gear, a first lever, a tension spring, a second lever, and a tripping shaft. The special gear includes the first rotation shaft and the first irregular convex flange feature. The irregular convex flange is lapped with a bending edge of one end of the first lever. The other end of the first lever is connected to the tension spring. An arc-shaped notch is provided at one end of the first lever which corresponds to the connecting spring. An arc-shaped protrusion matching the arc-shaped notch is provided at one end of the second lever. The arc-shaped protrusion engages with or separates from the arc-shaped notch to achieve the tripping operation. The frame-type ACB drawer seat according to the present invention is suitable for large-scale production applications.

2 Claims, 1 Drawing Sheet

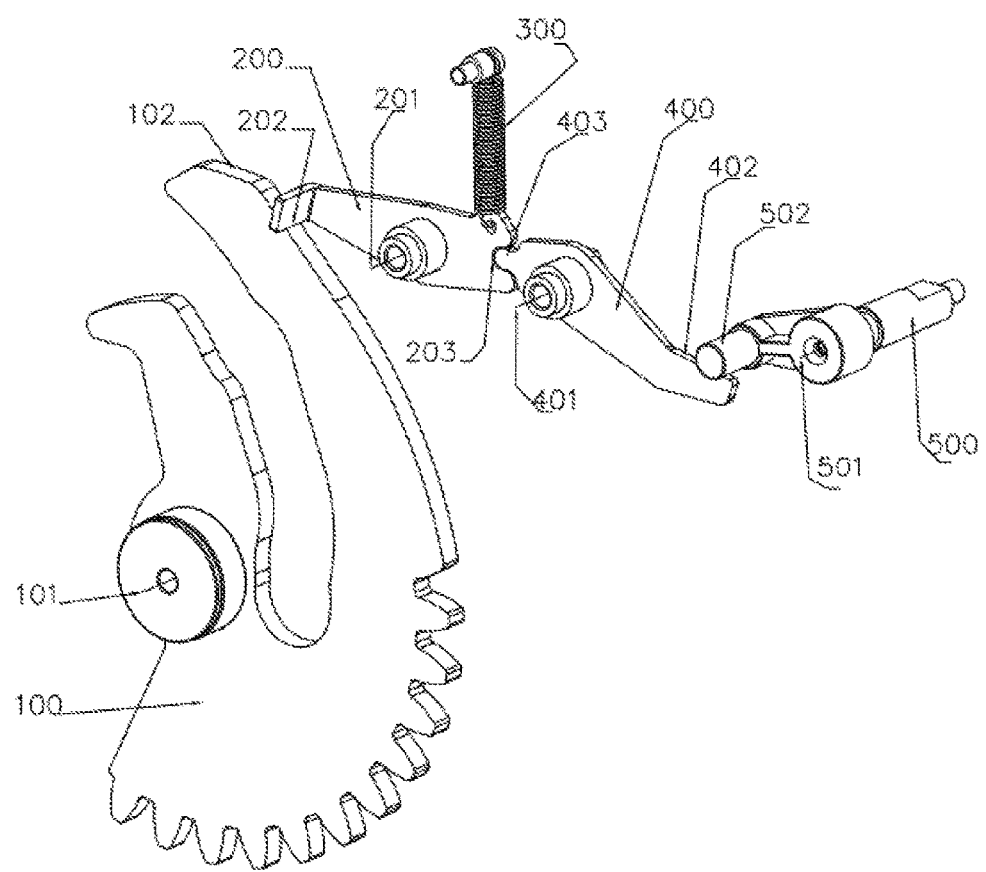

SAFETY TRIPPING DEVICE FOR A FRAME-TYPE ACB DRAWER SEAT

CROSS REFERENCE TO RELATED APPLICATIONS

This application is based upon and claims priority to Chinese Patent Application No. 201611044286.9 (CN), filed on Nov. 24, 2016, the entire contents of which are incorporated herein by reference.

TECHNICAL FIELD

The present invention relates to the technical field of a tripping device of low voltage circuit breaker, particularly to a safety tripping device for a frame-type ACB drawer seat.

BACKGROUND

With the rapid development of China's modernization process and the power industry, the low-voltage electrical technology is developing continuously. Accordingly, more and more function-integrated small-sized low-voltage electrical appliances come forth. The low-voltage circuit breaker has been widely used. The low-voltage circuit breaker, which is a switching device, not only can connect and break the normal load current and the overload current, but also can connect and the break short-circuit current. In the circuit, the low-voltage circuit breaker can perform a control function and certain protection functions, such as the protection of overload, short circuit, under voltage, leakage, and so on. The low-voltage electrical appliances have become the mainstream devices for the future development of the circuit breakers. ACB is an acronym for Air Circuit Breaker. Among others, the frame-type circuit breaker (also referred as frame breaker) is a low-voltage switch appliance with a large capacity. In the distribution system, the frame-type circuit breaker is used to connect and break the normal current. Under the condition of failure, i.e., when the circuit is abnormal, the circuit is automatically cut off by the frame-type circuit breaker to protect the lines, and equipment, and for personal safety. In the frame-type circuit breaker, the functional block which triggers an operation mechanism to cut off the circuit in response to a fault current is called the tripping device. In order to prevent the circuit breaker from being tripped or inserted in a power-on state, it is necessary to provide a mechanical interlocking mechanism. The function of the mechanical interlocking mechanism is described as follows. During the tripping operation of the circuit breaker, the tripping device is controlled by the mechanical interlocking mechanism to be tripped and switched off before the circuit breaker reaches the disengaged position from the coupling position. During the inserting operation of the circuit breaker, the tripping device is controlled by the mechanical interlocking mechanism for maintaining the tripping and switching-off state before the circuit breaker reaches the coupling position from the disengaged position. The practice has proved that the usage current frame-type ACB tripping devices have certain security risks. When the circuit breaker is installed into the drawer seat, if the switch is closed to power on at the time that the circuit breaker does contact the drawer seat reliably, sparks will be generated between the contacts. In a severe case, the circuit breaker may be burnt, which will cause a great security risk.

SUMMARY OF THE INVENTION

The technical problem to be solved by the present invention is to provide a safety tripping device for a frame-type ACB drawer seat which is simple in structure and easy to operate in view of the problems existing in the prior art.

In order to solve above technical problems, the technical solution used in the present invention is as follows. A safety tripping device for a frame-type ACB drawer seat is provided. The tripping device comprises an irregular gear, a first lever, a tension spring, a second lever, and a tripping shaft. The irregular gear comprises a first rotation shaft and a first irregular convex flange feature. The irregular convex flange is lapped with a bending edge of one end of the first lever. The other end of the first lever is connected to the tension spring. An arc-shaped notch is provided at one end of the first lever connected to tension spring. An arc-shaped protrusion matching the arc-shaped notch is provided at one end of the second lever. The second irregular convex flange feature is provided on the outer side of the other end of the second lever. A pendulum bar lapped with the second irregular convex flange feature is provided on the tripping shaft. The tripping operation is achieved by engaging or separating of the arc-shaped protrusion and the arc-shaped notch.

Further, the second rotation shaft is connected to one side of the first lever corresponding to the arc-shaped notch. The third rotation shaft is connected to one side of the second lever corresponding to the arc-shaped protrusion. The rotation direction of the second rotation shaft is configured to be reversed with respect to a rotation direction of the third rotation shaft. By a rotation operation of the second rotation shaft and a rotation of the third rotation shaft, the arc-shaped notch on the first lever and the arc-shaped protrusion on the second lever are driven to engage with or separate from each other to achieve the tripping operation.

Further, the fourth rotation shaft is provided on the tripping shaft. One end of a pendulum bar is lapped with the second irregular convex flange feature. The other end of the pendulum bar is connected to the tripping shaft through the fourth rotation shaft.

A safety tripping device for a frame-type ACB drawer seat of the present invention is designed with functions for specific space-scaled structure. By engaging or separating an arc-shaped notch on the first lever with an arc-shaped protrusion on the second lever, the second irregular convex flange feature of the second lever drives the pendulum bar which is lapped with the second irregular convex flange feature to move. Under the function of the pendulum bar, the tripping shaft can rotate around the fourth shaft to achieve the tripping operation. With the tripping device of the present invention, security risks can be avoided. The present invention has advantages of a simple structure, a smooth movement, an accurate action, convenience, flexibility, and reliable assembly. Also, the present invention is practical, and suitable for large-scale production applications.

BRIEF DESCRIPTION OF THE DRAWINGS

The present invention will be further described in detail with reference to the accompanying drawings.

FIG. 1 is a schematic structural view of the present invention.

In the drawings: 100 irregular gear, 101 the first rotation shaft, 102 the first irregular convex flange feature, 200 the first lever, 201 the second rotation shaft, 202 bending edge, 203 arc shaped notch, 300 tension spring, 400 the second lever, 401 the third rotation shaft, 402 the second irregular convex flange feature, 403 arc-shaped protrusion, 500 tripping shaft, 501 the fourth rotation shaft, 502 pendulum bar.

DETAILED DESCRIPTION OF THE EMBODIMENTS

As shown in FIG. 1, the present invention provides a safety tripping device for a frame-type ACB drawer seat. The tripping device comprises irregular gear 100, first lever 200, tension spring 300, second lever 400, and tripping shaft 500. Irregular gear 100 comprises first rotation shaft 101 and first irregular convex flange feature 102. Irregular convex flange 102 is lapped with bending edge 202 of one end of first lever 200. The other end of first lever 200 is connected to tension spring 300. Arc-shaped notch 203 is provided at the end of first lever 200 that is connected to tension spring 300. Arc-shaped protrusion 403 matching arc-shaped notch 203 is provided at one end of second lever 400. Second irregular convex flange feature 402 is provided on the outer side of the other end of second lever 400. Pendulum bar 502 overlapped with second irregular convex flange feature 402 is provided on tripping shaft 500. The tripping operation is achieved by engaging or separating arc-shaped protrusion 403 and arc-shaped notch 203.

Further, second rotation shaft 201 is connected to the side of first lever 200 which corresponds to arc-shaped notch 203. Third rotation shaft 401 is connected to the side of second lever 400 which corresponds to arc-shaped protrusion 403. The rotation direction of second rotation shaft 201 is configured to be reversed with respect to the rotation direction of third rotation shaft 401. By the rotation of second rotation shaft 201 and third rotation shaft 401, arc-shaped notch 203 on first lever 200 and arc-shaped protrusion 403 on second lever 400 are driven to engage with or separate from each other to achieve the tripping operation.

Further, fourth rotation shaft 501 is provided in tripping shaft 500. One end of pendulum bar 502 is lapped with second irregular convex flange feature 402. The other end of the pendulum bar is connected to tripping shaft 500 through the fourth rotation shaft 501.

In practice, a safety tripping device for a frame-type ACB drawer seat according to the invention is used. The working principle is as below:

Under the function of first rotation shaft 101, when irregular gear 100 is rotating around first rotation shaft 101 in a clockwise direction, first irregularly convex flange feature 102 on irregular gear 100 drives bending edge 202 which is lapped with the first irregularly convex flange feature 100 to move. The other end of first lever 200 is pushed to overcome the tension of tension spring 300 in the connecting state. The first lever rotates around second rotation shaft 201 in a clockwise direction. At the same time, arc-shaped notch 203 provided on first lever 200 is engaged with arc-shaped protrusion 403 provided on second lever 400, such that second lever 400 is driven to rotate around third rotation shaft 401 in an anti-clockwise direction. Thus, arc-shaped notch 203 and arc-shaped protrusion 403 are separated. At this time, second irregular convex flange feature 402 on the other end of second lever 400 drives pendulum bar 502 which is lapped with the second lever 400 to move. Under the function of pendulum bar 502, tripping shaft 500 rotates around fourth rotation shaft 501 in a clockwise direction to finally realize the tripping operation.

A safety tripping device for a frame-type ACB drawer seat of the present invention is designed with functions for specific space-scaled structure. By engaging or separating an arc-shaped notch on the first lever and an arc-shaped protrusion on the second lever, second irregular convex flange feature 402 on second lever 400 drives pendulum bar 502 which is lapped with the second irregular convex flange feature 402 to moved. Under the function of pendulum bar 502, tripping shaft 500 can rotate around fourth shaft 501 to achieve the tripping operation. With the tripping device of the present invention, security risks can be avoided. The present invention has advantages of having a simple structure, smooth movement, accurate action, convenience, flexibility, and reliable assembly. Also, the present invention is practical and suitable for large-scale production applications.

The scope of the present invention is not limited to the technical solutions disclosed in the embodiments. The above descriptions are merely the preferred embodiments of the present invention, but are not intended to limit the present invention. Any minor modifications, equivalent replacements, and improvements made in accordance with the technical solution of the present invention fall within the scope of the present invention.

What is claimed is:

1. A safety tripping device for a frame-type ACB drawer seat, comprising:
    an irregular gear,
    a first lever,
    a tension spring,
    a second lever, and
    a tripping shaft,
    wherein
    the irregular gear comprises a first rotation shaft and a first irregular convex flange feature;
    the first irregular convex flange is lapped with a bending edge of a first end of the first lever;
    a second end of the first lever is connected to the tension spring;
    an arc-shaped notch is provided at the first end of the first lever connected to the tension spring;
    an arc-shaped protrusion matching the arc-shaped notch is provided at a first end of the second lever;
    a second irregular convex flange feature is provided on an outer side of a second end of the second lever;
    a pendulum bar lapped with the second irregular convex flange feature is provided on the tripping shaft; and
    a tripping operation is achieved by engaging or separating of the arc-shaped protrusion and the arc-shaped notch; and wherein
    a fourth rotation shaft is provided on the tripping shaft;
    a first end of a pendulum bar is lapped with the second irregular convex flange feature; and
    a second end of the pendulum bar is connected to the tripping shaft through the fourth rotation shaft.

2. The safety tripping device for the frame-type ACB drawer seat according to claim 1, wherein
    a second rotation shaft is connected to one side of the first lever corresponding to the arc-shaped notch;
    a third rotation shaft is connected to one side of the second lever corresponding to the arc-shaped protrusion;
    a rotation direction of the second rotation shaft is configured to be reversed with respect to a rotation direction of the third rotation shaft; and
    the arc-shaped notch on the first lever and the arc-shaped protrusion on the second lever are configured to be driven to engage with or separate from each other to achieve the tripping operation by a rotation of the second rotation shaft and a rotation of the third rotation shaft.

* * * * *